US008977559B2

(12) United States Patent
Smith

(10) Patent No.: US 8,977,559 B2
(45) Date of Patent: *Mar. 10, 2015

(54) INTERACTIVE MARKETING SYSTEM

(75) Inventor: Glen David Smith, Auckland (NZ)

(73) Assignee: Zyzeba Holding Limited, Auckland (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 13/542,307

(22) Filed: Jul. 5, 2012

(65) Prior Publication Data
US 2013/0210469 A1 Aug. 15, 2013

Related U.S. Application Data

(63) Continuation-in-part of application No. 10/240,775, filed as application No. PCT/NZ01/00051 on Apr. 5, 2001, now Pat. No. 8,249,920.

(30) Foreign Application Priority Data

Apr. 7, 2000 (NZ) ........................................ 503817

(51) Int. Cl.
G06Q 30/02 (2012.01)
H04W 4/14 (2009.01)
(Continued)

(52) U.S. Cl.
CPC ............. *G06Q 30/0245* (2013.01); *H04W 4/14* (2013.01); *G06Q 30/02* (2013.01); *G06Q 30/0203* (2013.01); *G06Q 30/0267* (2013.01);
(Continued)

(58) Field of Classification Search
CPC .................................. G06Q 30/0207

USPC .................................................... 705/14.1, 14
See application file for complete search history.

(56) References Cited

U.S. PATENT DOCUMENTS 2,399,669 A * 5/1946 Frauenthal .................... 384/621
2,845,846 A * 8/1958 Kelleher ........................ 248/476
3,502,813 A * 3/1970 Walker ........................ 379/92.02
(Continued)

FOREIGN PATENT DOCUMENTS

AU 200113825 5/2001
AU 2001100406 11/2001
(Continued)

OTHER PUBLICATIONS

"m-Wise Launches First-Ever Interactive Text Messaging Competition," M-Wise press release of Nov. 20, 2000. from m-Wise website.
(Continued)

*Primary Examiner* — John G Weiss
*Assistant Examiner* — Breffni X Baggot
(74) *Attorney, Agent, or Firm* — Young & Thompson

(57) ABSTRACT

An interactive direct response system combines the use of short text message systems transmitted via GSM-SMS enabled cell phones with a database and website to enable advertisers to view in real time customer responses to a direct response campaign. Customers are invited to respond to a defined advertisement on for example a billboard by responding to a single telephone number associated with the website by sending a text message linked to that particular advertisement, i.e. a single word. A computer receives and analysis the responses and sends an acknowledgement message to the customer.

75 Claims, 8 Drawing Sheets

Promotion Structure

(51) Int. Cl.
*H04W 8/18* (2009.01)
*H04W 84/04* (2009.01)

(52) U.S. Cl.
CPC ............ *G06Q30/0207* (2013.01); *H04W 8/18* (2013.01); *H04W 84/042* (2013.01)
USPC ........................................ 705/14.1

(56) References Cited

U.S. PATENT DOCUMENTS

| | | | |
|---|---|---|---|
| 4,290,141 A * | 9/1981 | Anderson et al. | 725/24 |
| 4,962,377 A * | 10/1990 | Wallace et al. | 340/7.29 |
| 5,226,177 A * | 7/1993 | Nickerson | 725/24 |
| 5,263,723 A * | 11/1993 | Pearson et al. | 463/41 |
| 5,365,551 A * | 11/1994 | Snodgrass et al. | 375/141 |
| 5,377,354 A * | 12/1994 | Scannell et al. | 718/103 |
| 5,403,999 A * | 4/1995 | Entenmann et al. | 235/379 |
| 5,473,673 A * | 12/1995 | Van Wijk et al. | 379/92.01 |
| 5,500,650 A * | 3/1996 | Snodgrass et al. | 342/42 |
| 5,577,103 A * | 11/1996 | Foti | 455/412.1 |
| 5,579,372 A * | 11/1996 | Åström | 455/412.1 |
| 5,627,544 A * | 5/1997 | Snodgrass et al. | 342/42 |
| 5,717,866 A | 2/1998 | Naftzger et al. | |
| 5,768,509 A * | 6/1998 | Gunluk | 709/203 |
| 5,774,534 A * | 6/1998 | Mayer | 379/142.01 |
| 5,838,774 A * | 11/1998 | Weisser, Jr. | 379/92.02 |
| 5,852,775 A * | 12/1998 | Hidary | 455/412.1 |
| 5,857,156 A | 1/1999 | Anderson | |
| 5,878,397 A * | 3/1999 | Stille et al. | 455/466 |
| 5,937,392 A | 8/1999 | Alberts | |
| 5,946,629 A * | 8/1999 | Sawyer et al. | 455/466 |
| 5,948,061 A | 9/1999 | Merriman et al. | |
| 5,960,409 A | 9/1999 | Wexler | |
| 5,970,385 A * | 10/1999 | Pykalisto | 379/92.02 |
| 5,983,196 A * | 11/1999 | Wendkos | 705/14.14 |
| 6,006,197 A | 12/1999 | d'Eon et al. | |
| 6,009,409 A | 12/1999 | Adler et al. | |
| 6,044,135 A * | 3/2000 | Katz | 379/93.13 |
| 6,047,194 A | 4/2000 | Anderson | |
| 6,052,591 A * | 4/2000 | Bhatia | 455/445 |
| 6,114,969 A * | 9/2000 | Hymel | 340/7.48 |
| 6,151,507 A * | 11/2000 | Laiho et al. | 455/466 |
| 6,154,646 A * | 11/2000 | Tran et al. | 455/417 |
| 6,263,723 B1 * | 7/2001 | Takao et al. | 73/31.05 |
| 6,286,005 B1 | 9/2001 | Cannon | |
| 6,295,528 B1 * | 9/2001 | Marcus et al. | 707/759 |
| 6,332,127 B1 | 12/2001 | Bandera et al. | |
| 6,388,561 B1 * | 5/2002 | Tuttle | 340/10.1 |
| 6,415,156 B1 * | 7/2002 | Stadelmann | 455/466 |
| 6,470,181 B1 * | 10/2002 | Maxwell | 455/413 |
| 6,493,558 B1 * | 12/2002 | Bernhart et al. | 455/466 |
| 6,505,052 B1 * | 1/2003 | Jou | 455/466 |
| 6,512,926 B1 * | 1/2003 | Henry-Labordere | 455/445 |
| 6,560,456 B1 * | 5/2003 | Lohtia et al. | 455/445 |
| 6,564,261 B1 * | 5/2003 | Gudjonsson et al. | 709/227 |
| 6,647,256 B1 * | 11/2003 | Stewen et al. | 455/414.1 |
| 6,671,513 B1 * | 12/2003 | Frank et al. | 455/456.1 |
| 6,754,641 B2 * | 6/2004 | Kolls | 705/44 |
| 7,010,263 B1 | 3/2006 | Patsiokas | |
| 2001/0016819 A1 | 8/2001 | Kolls | |
| 2002/0013711 A1 * | 1/2002 | Ahuja et al. | 705/1 |
| 2002/0044058 A1 * | 4/2002 | Heinrich et al. | 340/572.1 |
| 2002/0132575 A1 | 9/2002 | Kesling et al. | |
| 2003/0036395 A1 * | 2/2003 | Proidl | 455/466 |
| 2003/0079135 A1 * | 4/2003 | Jones | 713/182 |
| 2003/0145037 A1 * | 7/2003 | Von Garssen | 709/201 |
| 2003/0194350 A1 * | 10/2003 | Stamatelos et al. | 422/83 |
| 2003/0200173 A1 * | 10/2003 | Chang | 705/40 |
| 2003/0219709 A1 * | 11/2003 | Olenick et al. | 434/350 |
| 2004/0010630 A1 * | 1/2004 | Becher-Wickes et al. | 709/250 |
| 2004/0014454 A1 * | 1/2004 | Burgess et al. | 455/405 |
| 2004/0034561 A1 * | 2/2004 | Smith | 705/14 |
| 2004/0078340 A1 * | 4/2004 | Evans | 705/64 |
| 2004/0088244 A1 * | 5/2004 | Bartter et al. | 705/38 |
| 2004/0097245 A1 * | 5/2004 | Sheth et al. | 455/466 |
| 2004/0116128 A1 * | 6/2004 | Chen | 455/456.1 |
| 2004/0116136 A1 * | 6/2004 | Voehringer | 455/466 |
| 2004/0132530 A1 * | 7/2004 | Rutanen et al. | 463/42 |
| 2004/0176081 A1 * | 9/2004 | Bryham et al. | 455/414.1 |
| 2004/0176666 A1 * | 9/2004 | Chait | 600/300 |
| 2004/0198329 A1 * | 10/2004 | Vasa | 455/414.1 |
| 2004/0203963 A1 * | 10/2004 | Shivaram et al. | 455/466 |
| 2004/0209677 A1 * | 10/2004 | Park et al. | 463/29 |

FOREIGN PATENT DOCUMENTS

| | | |
|---|---|---|
| BG | 107073 | 3/2004 |
| CA | 2405221 | 10/2001 |
| CA | 2354535 | 7/2004 |
| CA | 2418638 | 8/2004 |
| CN | 1432949 | 7/2003 |
| CN | 1437376 | 8/2003 |
| DE | 199 38 201 | 2/2001 |
| DE | 10 133 887 | 1/2003 |
| DE | 10 235 547 | 10/2003 |
| DE | 10 246 650 | 4/2004 |
| DE | 10 251 024 | 5/2004 |
| DE | 10 252 697 | 5/2004 |
| EP | 833469 | 1/1998 |
| EP | 0 896 484 | 2/1999 |
| EP | 986273 | 3/2000 |
| EP | 1091607 | 4/2001 |
| EP | 1096405 | 5/2001 |
| EP | 1109414 | 6/2001 |
| EP | 1139116 | 10/2001 |
| EP | 1184818 | 3/2002 |
| EP | 986275 | 7/2002 |
| EP | 1274262 | 1/2003 |
| EP | 1385297 | 1/2004 |
| FI | 982833 | 8/2000 |
| FR | 2845846 | 4/2004 |
| GB | 2308474 | 6/1997 |
| GB | 2373138 | 9/2002 |
| GB | 2384604 | 7/2003 |
| GB | 2387702 | 10/2003 |
| GB | 2390915 | 1/2004 |
| GB | 2393833 | 4/2004 |
| GB | 2400225 | 6/2004 |
| GB | 2399669 | 9/2004 |
| KR | 1020020051810 | 6/2002 |
| KR | 1020020056985 | 7/2002 |
| NZ | 330703 | 3/2000 |
| NZ | 501706 | 8/2001 |
| NZ | 522421 | 2/2003 |
| NZ | 503817 | 5/2003 |
| TW | 556124 | 10/2003 |
| WO | WO 88/05239 | 7/1988 |
| WO | WO 96/13814 | 5/1996 |
| WO | WO 97/17682 | 5/1997 |
| WO | WO 97/31306 | 8/1997 |
| WO | WO 97/49251 | 12/1997 |
| WO | WO 98/09255 | 3/1998 |
| WO | WO 98/09451 | 3/1998 |
| WO | WO 98/18251 | 4/1998 |
| WO | WO 98/47270 | 10/1998 |
| WO | WO 98/48587 | 10/1998 |
| WO | WO 99/01826 | 1/1999 |
| WO | WO 99/34272 | 7/1999 |
| WO | WO 99/42964 | 8/1999 |
| WO | WO 99/49680 | 9/1999 |
| WO | WO 99/59283 | 11/1999 |
| WO | WO 99/65256 | 12/1999 |
| WO | WO 99/66701 | 12/1999 |
| WO | WO 00/04476 | 1/2000 |
| WO | WO 00/18106 | 3/2000 |
| WO | WO 00/21293 | 4/2000 |
| WO | WO 00/22906 | 4/2000 |
| WO | WO 00/22907 | 4/2000 |
| WO | WO 00/22908 | 6/2000 |
| WO | WO 00/35216 | 6/2000 |
| WO | WO 00/41415 | 7/2000 |
| WO | WO 00/62518 | 10/2000 |
| WO | WO 00/62564 | 10/2000 |
| WO | WO 00/72612 | 11/2000 |

(56) References Cited

FOREIGN PATENT DOCUMENTS

| WO | WO 00/76235 | 12/2000 |
|---|---|---|
| WO | WO 01/13298 | 2/2001 |
| WO | WO 01/13341 | 2/2001 |
| WO | WO 01/22748 | 3/2001 |
| WO | WO 01/23055 | 4/2001 |
| WO | WO 01/37540 | 5/2001 |
| WO | WO 01/37595 | 5/2001 |
| WO | WO 01/47291 | 6/2001 |
| WO | WO 01/52541 | 7/2001 |
| WO | WO 01/52558 | 7/2001 |
| WO | WO 01/52572 | 7/2001 |
| WO | WO 01/67718 | 9/2001 |
| WO | WO 01/71949 | 9/2001 |
| WO | WO 01/75823 | 10/2001 |
| WO | WO 01/76173 | 10/2001 |
| WO | WO 01/77978 | 10/2001 |
| WO | WO 01/98983 | 12/2001 |
| WO | WO 02/11088 | 2/2002 |
| WO | WO 02/13120 | 2/2002 |
| WO | WO 02/21416 | 3/2002 |
| WO | WO 02/27629 | 4/2002 |
| WO | WO 02/44829 | 6/2002 |
| WO | WO 02/076122 | 9/2002 |
| WO | WO 02/101584 | 12/2002 |
| WO | WO 03/083737 | 10/2003 |
| WO | WO 03/084187 | 10/2003 |
| WO | WO 03/084252 | 10/2003 |
| WO | WO 2004/010361 | 1/2004 |
| WO | WO 2004/034212 | 4/2004 |
| WO | WO 2004/049716 | 6/2004 |
| WO | WO 2004/068386 | 8/2004 |
| WO | WO 2004/068880 | 8/2004 |

OTHER PUBLICATIONS

"First Interactive Texting Competition Proves a Winner," M-Wise press release of Dec. 4, 2000, from m-Wise website.
Decision from Intellectual Property Office of New Zealand dated Mar. 13, 2006, regarding the Opposition of an application for New Zealand Letters Patent No. 503817.
"Paegas: new offerings for April", T-Mobile Press Centre, http://en.t-press.cz/tiskove zpravy/1999/66, Apr. 1, 1999.
"In Paegas Brand STores You can Buy a Mobile Phone in Installmetns Too", T-Mobile Press Centre, http:/en.t-press.cz/toskovezpravy/2000/143/. Apr. 5, 2000.
"RadioMobilA's Revenues Reached the Boundary of 11 Billion Crowns in 1999", T-Mobile Press Centre, http/en.t-press.cz/tiskove zpravy/2000/142/, Apr. 4, 2000.
"Novelties for April: Paegas Offers Three Phones Supporting WAP", T-Mobile PRess Centre, http://en.t-press cz/tiskove zpravy/2000/140/. Mar. 31, 2000.
"Only Users of Paegas Services Can Use GSM BAnking", T-Mobile PRess Centre, http://en.t-press.cztiskove zpravy/2000/138/, Mar. 23, 2000.
"As the First in the World, Paegas Offers GSM Banking on Prepaid Cards", T-Mobile Press Centre, http://en.tpress.cz/tiskove zpravy/2000/137/, Mar. 23, 2000.
"RadioMobil Rises on the Chart of the Most Admired Czech Companies", T-Mobile Press Centre, http://en.t-press.cz/tiskove zpravy/2000/136/, Mar. 23, 2000.
"Practically All Users of Paegas Servies Tried a Half Price Call", T-Mobile Press Centre, http://ent-press.cz/tiskove zpravy/2000/135/ Mar. 21, 2000.
"Paegas Comes With a World Unique Service for Foreign Customers", T-Mobile Press Centre, http://en.t-press cz/tiskove zpravy/2000/134/. Mar. 20, 2000.
"All Users of Paegas Services Will Celebrate the Overstepping of the Million Boundary", T-Mobile Press Centre, http://en.t-press cz/tiskove zpravy/2000/133/. Mar. 14, 2000.
Paegas Is the First GSM Network Offering Data and Fax for Free to All Customers, T-Mobile Press Centre http://en.t-press cz/tiskove zpravy/2000/131/, Mar. 8, 2000.

"Twist Is the First Pre-paid Service Allowing W@P Applications", T-Mobile Press Centre http://en.tpress cz/tiskove zpravy/2000/130/, Mar. 8, 2000.
"You Can Get the Most Advantageous Pre-paid Service Paegas Twist for Only CZK 1399", T-Mobile Press Centre http://en.t-press.cz/tiskove zpravy/2000/129/, Mar. 6, 2000.
"RadioMobil Invest Billions into Its Network Every Year", T-Mobile PRess Centre, http://en.t-press.cz/tiskove zpravy/2000/128/. Feb. 23, 2000.
"Awards received by RadioMobil in 1999-2000.", T-Mobile Press Centre, http://en.t-press cz.tiskove zpravy/2000/126/ Feb. 21, 2000.
"Paegas Twist, the most successful prepaid service in the Czech Republic, is also the cheapest", T-Mobile Press Centre, http://en.t-press.cz/tiskove zpravy/2000/125, Feb. 17, 2000.
"Paegas to expand its offer of WAP services", T-Mobile Press Centre, http://en.t-press.cz/tiskove zpravy/2000/124/, Feb. 15, 2000.
"For the first time in the Czech Republic, a single operator earned more than 500,000 new customers in one year", T-Mobile Press Centre, http:// en.t-press.cz/tiskove zpravy/2000/122/, Jan. 6, 2000.
"Paegas dominates the mobile communications market in the Czech Republic", T-Mobile Press Centre, http://en.t-press.cz/tiskove zpravy/1999/121, Dec. 6, 1999.
"Pre-Christmas innovations from Paegas", T-Mobile Press Centre, http://en.t-press.cz/tiskove zpravy/1999/118/, Nov. 30, 1999.
"With Paegas Gold certificate, mobile telephone activation is free", T-Mobile Press Centre, http://en-press.cz tiskove zpravy/1999/117,. Nov. 22, 1999.
The indoor stadium (Sportovni haia) at Pragues Exhibition Grounds (VystavistA?) is to be named Paegas Arena, T-Mobile Press Centre http://en.tpress.cz/tiskove zpravy/1999/116, Nov. 18, 1999.
"Paegas hosts prominent world dignitaries", T-Mobile Press Centre, http://en.t-press.cz/tiskove zpravy/1999/115/, Nov. 16, 1999.
"A Christmas present from Paegas to every new customer", T-Mobile Centre, http://en.t-press.cztiskove zpravy/1999/113/, Nov. 10, 1999.
"Announcement", T-Mobile Press Centre, http://en.t-press.cz/tiskove zpravy/1999/112/, Nov. 9, 1999.
"Louny Call Center commences operation", T-Mobile Press Centre, http://en.t-press.cz/tiskove zpravy/1999/111/, Nov. 5, 1999.
The biggest advantages while travelling abroad are available with Twist, T-Mobile Press Centre, http://en.t-press.cz/tiskove zpravy/1999/110/. Nov. 4, 1999.
"Paegas customers can now communicate in seven languages", T-Mobile Press Centre, http://en.t-press.cz/tiskove zpravy/1999/109/, Nov. 1, 1999.
"Paegas Nej—call your friends at a discount of up to 50%", T-Mobile Press Centre, http://en.t-press.cz/tiskove zpravy/1999/108/, Nov. 1, 1999.
"The Czech public regards RadioMobil as one of the most go-ahead companies—and one of the most expanding", T-Mobile Press Centre, http://en.t-press cz/tiskove zpravy/1999/107/, Oct. 11, 1999.
"Coca Cola via the Paegas Network", T-Mobile PRess Centre, http://en.t-press.cz/tiskove zpravy/1999/102/, Oct. 4, 1999.
"RadioMobil has received confirmation that is has fulfilled the licence conditions,", T-Mobile Press eEntre, http://en.t-press.cztiskove zpravy/1999/96, Aug. 13, 1999.
Paegas Internet Call: Better and faster international connections at advantageous prices, T-Mobile Press Centre, http://en.t-press.cztiskove zpravy/1999/93/Jul. 27, 1999.
"Paegas is winning the battle for customers", T-Mobile Press Centre, http"://en.t-press.cz/tiskove zpravy/1999/92/, Jul. 16, 1999.
"Mobile Internet Becomes Reality in the Paegas Network Thanks to the GPRS Technology", T-Mobile PRess Centre, http://en.t-press.cz/tiskove zpravy/1999/91/, Jul. 14, 1999.
"Hot Festival News in a Mobile", T-Mobile Press Centre, http://en.t-press.cztiskove zpravy/ 1999/88/Jul. 1, 1999.
"Paegas opens its 20" outlet, T-Mobile Press Centre, http://en.t-press.cztiskove zpravy/1999/89/ Jul. 1, 1999.
"Easy Travelling Around the World with Paegas", T-Mobile Press Centre, http://en.t-press.cz/tiskove zpravy/1999/87/, Jun. 24, 1999.
"Paegas Assistant 333 gets enthusiastic response", T-Mobile Press Centre, http://en.t-press.cztiskove zpravy/1999/81/, May 28, 1999.
"Paegas no longer 603 but 604 as well", T-Mobile Press Centre, http://en.t-press.cztiskove zpravy/1999/82/, May 28, 1999.

(56) References Cited

OTHER PUBLICATIONS

"The widest offer of Paegas Twist packets and other news in half of May", T-Mobile Press Centre, http://en.t-press.cztiskove zpravy/1999/78/, May 14, 1999.
"WAP Technology Brings Internet to Paeas GSM Mobile Telephones", T-Mobile Press Centre, http://en.t-press.cztiskove zpravy/1999/77/, May 10, 1999.
"Custsomers in the Czech Republic prefer GSM services", T-Mobile Press Centre, http://en.t-press.cztiskove zpravy/1999/71/, May 3, 1999.
"Paegas Asistent 333:effective, quick and safe communication", T-Mobile Press Centre, http://en.t-press.cztiskove zpravy/1999/73/, May 3, 1999.
"Mobile with Paegas SIM Toolkit Twist card only 4,499 KAT", T-Mobile Press Centre, http://en.t-press.cz/tiskove zpravy/1999/68/ Apr. 14, 1999.
"Paegas services collect more awards", T-Mobile Press Centre, http://en.t-press.cz/tiskove zpravy/1999/65/, Apr. 1, 1999.
"Paegas offers lowest prices on telecommunications services", T-Mobile Press Centre, http://en.t-press cz./tiskova zpravy/1999/64/, Mar. 31, 1999.
"Paegas Customers have Been Able to Call Even From Prague Underground Since Friday, Mar. 19, 1999", T-Mobile Pess Centre, http://en.t-press.cz/tiskove zpravy/1999/62/, Mar. 19, 1999.
"RadioMobil named most-respected telecommunications company in Czech Republic", T-Mobile Press Centre, http://en.t-press.cztiskove zpravy/1999/57/, Mar. 4, 1999.
"RadioMobil forced to halt Paegas Internet Call services at 5:00 p.m. today", T-Mobile Press Centre, http://en.t-press.cz/tiskove zpravy/1999/56//, Feb. 25, 1999.
"Over 1 million SMS messages sent using prepaid Twist cards", T-Mobile Press Centre, http"//en.t-press.czniskove zpravy/1999/56/, Feb. 25, 1999.
"RadioMobil to become main partner of Czech National Basketball Federation", T-Mobile Press Centre, http://en.t-press.cz/tiskove zpravy/1999/55, Feb. 16, 1999.
Europe for 9.50 Kc, International for 12.90 Kc per minute, T-Mobile Press Centre, http://en.t-press.cz/tiskove zpravy/1999/53/, Jan. 28, 1999.
"Paegas GSM network covers 96 percent of Czech population", T-Mobile Press Centre, http://en.t-press.cz/tiskove zpravy/1999/52/, Jan. 22, 1999.
"Paegas TWIST becomes first system to successfully transmit SMS", T-Mobile Press Centre, http://en.t-press.cz/tiskove zpravy/1999/49/, Jan. 14, 1999.
Paegas growth outstrips Czech mobile communications market by wide margin, T-Mobile Press Centre, http://en.t-press.cz/tiskove zpravy/1999/50/, Jan. 14, 1999.
"No monthly fees, telephones for 1 Kc beginning in January", T-Mobile Press Centre, http://en.t-press.cz/tiskove zpravy/1998/48/, Dec. 31, 1998.
"Paegas donates half a million crowns to 1st Children's Clinic of Motol Faculty Hospital", T-Mobile Press Centre, http://en.t-press.cz/tiskove zpravy/1998/47/, Dec. 18, 1998.
"Paegas issues first directory of GSM users in Czech Republic", T-Mobile Press Centre, http://en.t-press.cz/tiskove zpravy/1998/45/, Nov. 30, 1998.
"Paegas GSM offers for December Paegas Twist packages includes two Mobile of the Year winners", T-Mobile Press Centre, ptth://em.t-press.cztiskove zpravy/1998/46/, Nov. 30, 1998.
"Paegas becomes main partner to Mobile of the Year survey", T-Mobile Press Centre, http://en.t-press.cz/tiskove zpravy/1998/44/, Nov. 26, 1998.
"Paegas rapidly increasing number of transmission stations", T-Mobile Press Centre, http://en.t-press.cz/tiskove zpravy/1998/32/, Nov. 24, 1998.
The first Office Action received in the corresponding Canadian Application No. 2,405,221 dated Jan. 13, 2006.

\* cited by examiner

FIG 6

Structure of a GSM network (key elements)

INTERACTIVE MARKETING SYSTEM

CROSS REFERENCE TO RELATED APPLICATIONS

This application is a continuation-in-part of application Ser. No. 10/240,775 filed on Sep. 12, 2003, which is a National Stage of PCT/NZ01/00051 filed on Apr. 5, 2001, which claims foreign priority to New Zealand Application No. 503817 filed on Apr. 7, 2000. The entire content of each of these applications is hereby expressly incorporated by reference.

FIELD OF THE INVENTION

This invention relates to an interactive marketing and/or survey system in particular but not limited to a marketing and/or survey system utilising short message services (GSM-SMS) provided on mobile or cell phones.

BACKGROUND ART

Traditional marketing and survey techniques have required survey companies to use pollsters to contact consumers by telephone and ask a series of questions, and then to have that data entered by the pollster or data entry clerk into a database. Some surveys are conducted by mail, and some marketing techniques request the consumer to fill out a pre printed reply card, mail it to the advertiser, and then the results are entered by a data entry clerk and the results analysed. All this takes time for the consumer, is costly for the advertiser and in any event has a considerable lag between the compiling of the questions and analysing the results.

PRIOR ART

U.S. Pat. No. 5,717,866—Issued to Naftzger in 1998 relates to a method for comparative analysis of consumer response to product promotions which provide discounts during point of sale transactions. This makes use of a keypad controlled by a cashier at a point of sale, and requires the cashier to send a code on the keypad to the appropriate computer system to then receive authorisation in relation to that discount before then checking through the items being purchased by the customer at the discounted price. It is limited to hardware installed at the point of sale.

USP 2002/0132575—this patent application was filed on 31 May 2001 and was published on 19 Sep. 2002. It relates to mobile commerce using a satellite radio broadcasting system. It is designed to help identify what programmes or parts of programmes are being listened by the public.

U.S. Pat. No. 7,010,263—this patent issued to Patsioks in 2006 and relates to a system and method for distributing music and data. This is another satellite based broadcasting system.

U.S. Pat. No. 5,960,409—this patent issued to Wexler in 1999 and relates to a third party online accounting system. It is an internet based system in which a download request signal is generated when a user clicks on a banner displayed on a web page.

U.S. Pat. No. 6,006,197—this patent issued to D'Eon et al in 1999 and relates to a system and method for assessing effectiveness of internet marketing campaigns. It is designed to correlate the number of impressions of web advertisements post impression transactional activity to measure the effectiveness of advertisements on web sites.

U.S. Pat. No. 6,286,005—issued to Cannon in 2001 and relates to a method and apparatus for analysing data and advertising optimisation. It relates to a data base mining engine designed to rank the effectiveness of different advertisements.

U.S. Pat. No. 5,857,156—issued to Anderson in 1999 and relates to personal intercommunication purchase and fulfillment system. It makes use of a satellite radio system, and a FM narrow band pager to communicate the customers request to purchase an item using an item code, and transmitting that to a base station to an appropriate supply house to ensure that the product is supplied to the base station.

U.S. Pat. No. 5,948,061—issued to Merriman et al in 1999 and relates to a method of delivery targeting and measuring advertising over network. It provides means for compiling statistics on individual users and networks and the use of advertisements on the internet.

U.S. Pat. No. 5,937,392—issued to Alberts in 1999 and relates to banner advertisement display system and method with frequency of advertisement control. This web based advertising system that determines how often a banner advertisement is displayed.

This list of patents are compiled from patents cited by the USPTO and either relate to point of sale electronic coupons as discussed in U.S. Pat. No. 5,717,866, or relate to means for analysing the effectiveness of advertisements on the internet.

All are cumbersome to implement and require the consumer to interact either with in store hardware, or by means of computers or two way pagers.

Object of the Invention

It is an object of the present invention to provide a viable interactive marketing and/or survey system based on SMS messages, transmitted to mobile or cell phones or to at least provide the public with a useful choice.

SUMMARY OF THE INVENTION

In one aspect the invention provides an interactive marketing and/or survey system utilising short message systems (GSM-SMS) provided on mobile or cell phones including in combination a means of displaying an advertisement, the advertisement inviting a participant to respond with a defined short text message via SMS on a mobile or cell phone, computerised means for comparing and matching the participants short text message with one or more retained reference records, wherein in operation, if the participant's short text message matches any of the one or more records, information from the message is stored in a database.

Preferably the advertisement invites participants to respond to a common "reply to" telephone number.

Preferably all advertisements associated with the system use the same common "reply to" telephone number but each advertising campaign uses distinct pre-allocated short text message(s) and the computerised means analyses and displays the incoming replies and sorts them into their associated campaigns.

By making use of the present and developing ability to display short text messages on mobile or cell phones by what is known as short message services (GSM-SMS), the invention provides a way of using such short text messages as a means of advertising as well as for obtaining consumer feed back from existing main stream advertising media inclusive of television, radio, films, magazines, newspapers, bill boards and the Internet.

With the growth of the mobile or cell phone market worldwide and in particular the acceptance and use of SMS (Short Message Service) there has now opened up an opportunity for applications using this technology.

Typical mobile phone users carry their phones constantly as they go about their day to day business such as when reading the morning paper, travelling to work, passing billboards, reading magazines, and watching television. If they notice an advertisement which invites them to take action such as to "Win a trip" or "Give us your opinion" mobile phone users are more likely to respond if the process required is low cost, quick and simple when compared to making a conventional phone call or posting a letter, and examples of this are shown in the detailed description of this invention.

Importantly the present invention embraces what is regarded as a "pull" service as it is the consumer who actually initiates the transaction so that the implementation is considered to be "friendly". Unsolicited messages are not desirable in the mobile phone industry and the present system overcomes that requirement. The subject invention involves the application of a database having conditional filtering criteria to correlate a consumer's response or short text message to an advertising client's promotional offer. Criteria chosen in the advertiser's promotion will be used to determine the appropriate reply message or consumer response. In addition, by offering incentives to respond to advertisements, consumers will provide real time feedback indicating the effectiveness of the advertisements. The content of a particular response can indicate the consumer's recognition of the product or his or her opinion of the product. By this means, valuable survey evidence can be obtained. The content of the response can also provide the location and/or the publication in which the advertisement appeared. In the case of television or radio advertising the station which broadcasted the advertisement can also be identified by the particular response message. Multiple promotions could be run simultaneously using the same destination phone number as the content of the SMS will be specific to and will identify the particular promotion. Furthermore, to make it easier for participants, they can also store the phone number for later use. In the detailed examples, the competition participants are directed to a website by notifying the particular 'www' web address location in the SMS reply message, revenue from hits on the website can be generated. Real time voting or survey evidence can also be collected by this means. By using a special data base application, multiple voting by the same voter on the same mobile phone can be eliminated. Furthermore, real time graphical and statistical reports can be generated and supplied to clients of the service via a secured Internet interface system.

Preferably the means of displaying an advertisement can be television, magazines, newspapers, billboards films, and/or the Internet.

Preferably the advertisement can be broadcast on radio or other non-visual means.

Preferably the computerised means for comparing and matching the participant's short text message response is a computer database which is connected by a virtual private network via the Internet to the SMS provider.

Preferably the computerised means also includes means for recording the number of correct and incorrect responses made by participants and the number of reply messages sent to the participants.

Preferably the computerised means can accommodate a number of phone numbers and/or groups of reference records corresponding to different advertisement offers or surveys conducted and a record is kept of the frequency of responses to each phone number or group of records, so that quantitative data such as the frequency or total number of consumer or voting response to a particular promotion or survey can be obtained.

Preferably the short text message response of a participant or consumer is a single word which can be easily compared and matched against a reference list of "correct" words stored on the computer database.

Preferably the Internet website to which the participant is instructed to access is a dedicated website which centrally co-ordinates all incoming SMS messages and provides the participants with further information in order to continue or proceed to the next step of the marketing or survey system.

In another aspect the invention resides in an interactive marketing and/or survey system utilising short message systems (GSM-SMS) provided on mobile or cell phones including in combination a means of displaying an advertisement, the advertisement inviting a participant to respond with a short text message via SMS on a mobile or cell phone, computerised means for comparing and matching the participants short text message with one or more retained reference records, wherein in operation, if the participant's short text message matches any of the one or more records, a reply message is sent by said computerised means to the participant's mobile or cell phone instructing the participant to proceed to a next step, typically to access an Internet website.

Preferably the means of displaying an advertisement can be television, magazines, newspapers, billboards, films, and/or the Internet.

In the alternative the advertisement can be broadcast on radio or other non-visual means.

Preferably the computerised means for comparing and matching the participant's short text message response is a computer database which is connected by a virtual private network via the Internet to the SMS provider.

Preferably the computerised means also includes means for recording the number of correct and incorrect responses made by participants and the number of reply messages sent to the participants.

Preferably the computerised means can accommodate a number of phone numbers and/or groups of reference records corresponding to different advertisement offers or surveys conducted and a record is kept of the frequency of responses to each phone number or group of records. By such means quantitative data such as the frequency or total number of consumer or voting response to a particular promotion or survey can be obtained.

Preferably the short text message response of a participant or consumer is a single word which can be easily compared and matched against a reference list of "correct" words stored on the computer database.

Preferably the Internet website to which the participant is instructed to access is a dedicated website which centrally co-ordinates all incoming SMS messages and provides the participants with further information in order to continue or proceed to the next step of the marketing or survey system.

BRIEF DESCRIPTION OF THE DRAWINGS

In order to understand the invention more fully, reference is made to the accompanying illustrations wherein:

FIG. 6: shows a log of calls made in testing the invention.

DETAILED DESCRIPTION OF THE DRAWINGS

Figure 1:
FIG. 1: shows an example of an advertisement requiring an SMS texted response according to Example 1.

Short Message Service (SMS) is a text messaging service component of phone, web, or mobile communication systems, using standardized communications protocols that allow the exchange of short text messages between fixed line or mobile phone devices. SMS text messaging is the most widely used data application in the world, with 2.4 billion active users, or 74% of all mobile phone subscribers. The term SMS is used as a synonym for all types of short text messaging as well as the user activity itself in many parts of the world. SMS is also being used as a form of direct marketing known as SMS marketing. SMS as used on modern handsets was originated from radio telegraphy in radio memo pagers using standardized phone protocols and later defined as part of the Global System for Mobile Communications (GSM) series of standards in 1985 [as a means of sending messages of up to 160 characters, [to and from GSM mobile handsets. Since then, support for the service has expanded to include other mobile technologies such as ANSI CDMA networks and Digital AMPS, as well as satellite and landline networks. Most SMS messages are mobile-to-mobile text messages though the standard supports other types of broadcast messaging as well.

The SMS concept was developed in the Franco-German GSM cooperation in 1984 by Friedhelm Hillebrand and Bernard Ghillebaert. [The innovation in SMS is Short. The GSM is optimized for telephony, since this was identified as its main application. The key idea for SMS was to use this telephony-optimized system, and to transport messages on the signaling paths needed to control the telephony traffic during time periods when no signaling traffic existed. In this way, unused resources in the system could be used to transport messages at minimal cost. However, it was necessary to limit the length of the messages to 128 bytes (later improved to 140 bytes, or 160 seven-bit characters) so that the messages could fit into the existing signaling formats.

This concept allowed SMS to be implemented in every mobile station by updating its software. This concept was instrumental for the implementation of SMS in every mobile station ever produced and in every network from early days. Hence, a large base of SMS capable terminals and networks existed when the users began to utilize the SMS. A new network element required was a specialized short message service center, and enhancements were required to the radio capacity and network transport infrastructure to accommodate growing SMS traffic.

The first SMS message [was sent over the Vodafone GSM network in the United Kingdom on 3 Dec. 1992, from Neil Papworth of Sema Group (now Mavenir Systems) using a personal computer to Richard Jarvis of Vodafone using an Orbitel 901 handset. The text of the message was "Merry Christmas".

The first commercial deployment of a short message service center (SMSC) was by Aldiscon part of Logica (now part of Acision) with Telia (now TeliaSonera) in Sweden in 1993, [followed by Fleet Call (now Nextel) in the US, Telenor in Norway] and BT Cellnet (now O2 UK) later in 1993. All first installations of SMS gateways were for network notifications sent to mobile phones, usually to inform of voice mail messages. The first commercially sold SMS service was offered to consumers, as a person-to-person text messaging service by Radiolinja (now part of Elisa) in Finland in 1993. Most early GSM mobile phone handsets did not support the ability to send SMS text messages, and Nokia was the only handset manufacturer whose total GSM phone line in 1993 supported user-sending of SMS text messages.

Initial growth was slow, with customers in 1995 sending on average only 0.4 messages per GSM customer per month. One factor in the slow takeup of SMS was that operators were slow to set up charging systems, especially for prepaid subscribers, and eliminate billing fraud which was possible by changing SMSC settings on individual handsets to use the SMSCs of other operators.

The Short Message Service-Point to Point (SMS-PP) was originally defined in GSM recommendation 03.40, which is now maintained in 3GPP as TS 23.040. [GSM 03.41 (now 3GPP TS 23.041) defines the Short Message Service-Cell Broadcast (SMS-CB), which allows messages (advertising, public information, etc.) to be broadcast to all mobile users in a specified geographical area.

Messages are sent to a Short message service center (SMSC) which provides a "store and forward" mechanism. It attempts to send messages to the SMSC's recipients. If a recipient is not reachable, the SMSC queues the message for later retry. Some SMSCs also provide a "forward and forget" option where transmission is tried only once. Both mobile terminated (MT, for messages sent to a mobile handset) and mobile originating (MO, for those sent from the mobile handset) operations are supported. Message delivery is "best effort", so there are no guarantees that a message will actually be delivered to its recipient, but delay or complete loss of a message is uncommon, typically affecting less than 5% of messages. Some providers allow users to request delivery reports, either via the SMS settings of most modern phones, or by prefixing each message with *0# or *N#. However, the exact meaning of confirmations varies from reaching the network, to being queued for sending, to being sent, to receiving a confirmation of receipt from the target device, and users are often not informed of the specific type of success being reported.

GSM (Global System for Mobile Communications, originally Groupe Spécial Mobile), is a standard set developed by the European Telecommunications Standards Institute (ETSI) to describe technologies for second generation (or "2G") digital cellular networks. Developed as a replacement for first generation analog cellular networks, the GSM standard originally described a digital, circuit switched network optimized for full duplex voice telephony. The standard was expanded over time to include first circuit switched data transport, then packet data transport via GPRS. Packet data transmission speeds were later increased via EDGE. The GSM standard is succeeded by the third generation (or "3G") UMTS standard developed by the 3GPP. GSM networks will evolve further as they begin to incorporate fourth generation (or "4G") LTE Advanced standards. "GSM" is a trademark owned by the GSM Association.

The Structure of a GSM Network

Figure 8:
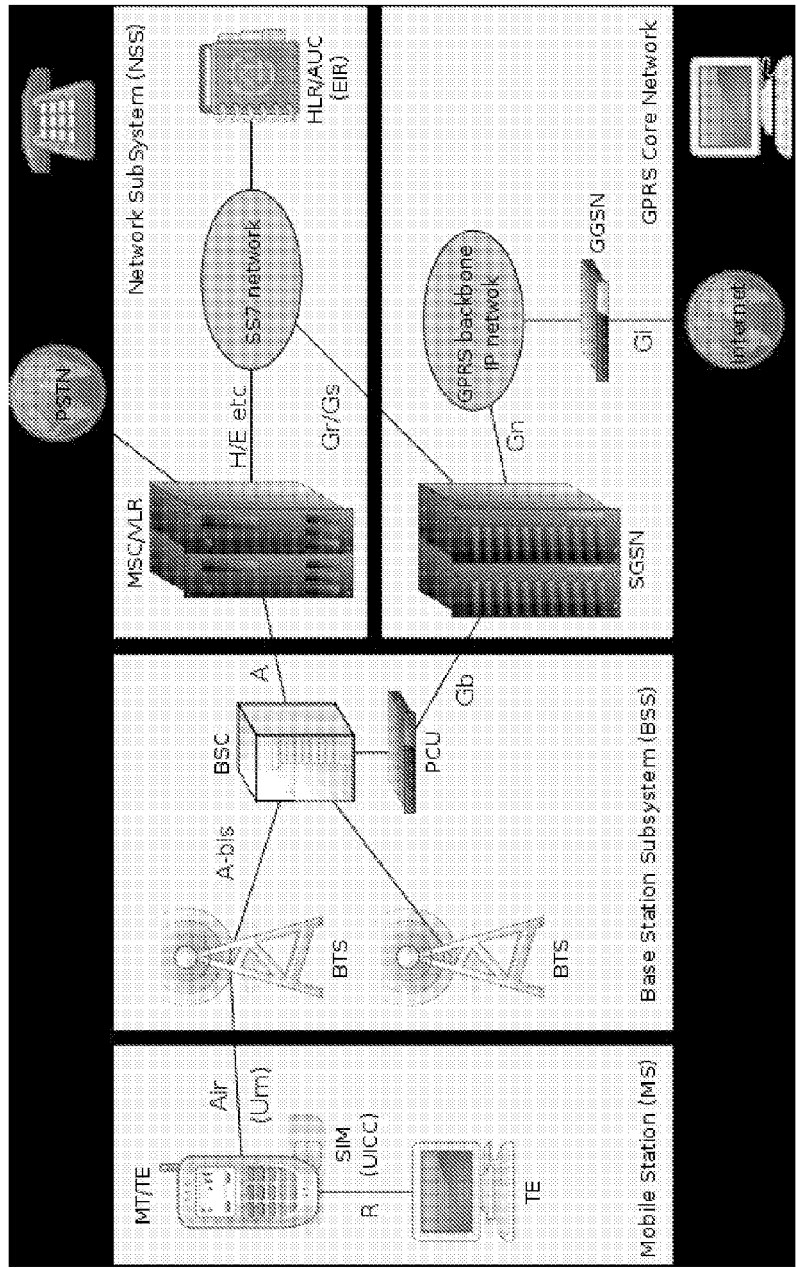
FIG. 8: shows a schematic layout of the components of a GSM network.

The network is structured into a number of discrete sections shown in FIG. 8:

The Base Station Subsystem (the base stations and their controllers).

The Network and Switching Subsystem (the part of the network most similar to a fixed network). This is sometimes also just called the core network.

The GPRS Core Network (the optional part which allows packet based Internet connections).

The Operations support system (OSS) for maintenance of the network

U.S. Pat. No. 5,878,397 has a laymans explanation of the Global System for Mobile Communications) GSM which supports the Short Message System (SMS)

U.S. Pat. No. 5,878,397 issued to Stille et al on Mar. 2, 1999, outlines the protocols used in the Global System for Mobile Communications) GSM which supports the Short Message System (SMS) and notes:

"A special telecommunications service supported by the GSM is the Short Message Service (SMS). The SMS enables the GSM to route short text messages, each up to 160 alphanumeric characters long, over the signalling channels to or from mobile stations. If a mobile station for which a short message is intended is not in service, or has left the coverage area, the message is stored in a Short Message Service Center (SMS-C). The SMS-C forwards the message to the mobile station when it returns to service or re-enters the coverage area. The SMS can also transfer short messages between a Short Message Service Terminal (SMT) in a data network and GSM mobile stations.

The GSM is divided into a switching subsystem and base station subsystem. A call from a mobile station is received by a base transceiver station, which is part of the base station subsystem. The base transceiver station defines an individual cell in a geographical service area. A base station controller also in the base station subsystem controls a group of base transceiver stations (cells). A number of base station controllers are served by a mobile services switching center (MSC), which forms a part of the switching subsystem. The MSC controls calls to and from other telephone and data communications systems, such as the Public Switched Telephone Network (PSTN), Integrated Services Digital Network (ISDN), Public Land Mobile Network (PLMN), and various public and private data networks.

If a user in another network (e.g., PSTN) calls a GSM subscriber, the call is connected to a gateway MSC (GMSC). The GMSC finds the location of the GSM subscriber by interrogating a home location register (HLR), which is a database in the switching subsystem. The HLR provides the address of the GSM subscriber in its most current MSC area. The GMSC routes the call to that MSC. The current location of the GSM subscriber is maintained in a visitor location register (VLR), a database containing information about all of the GSM subscribers currently located in that MSC's area. If the GSM subscriber roams into a new MSC area, the VLR associated with the new MSC requests information about the subscriber from the HLR. At the same time, the HLR is informed about the new MSC area in which the subscriber resides.

In the GSM, a short message can be mobile originated or mobile terminated. A mobile originated short message is submitted from a mobile terminal via a base transceiver station to the visited MSC. The visited MSC forwards the message to the SMS-C given by the originating mobile terminal. The SMS-C forwards the message to its destination, which can be a mobile station or a terminal in the data network.

A mobile terminated short message is submitted by a user directly to an SMS-C. The SMS-C forwards the message to a short message service-gateway mobile services switching center (SMS-GMSC). The SMS-GMSC interrogates the related HLR for transporting information, and reroutes the message to the appropriate MSC. The destination mobile station is paged and a connection is set up between the MSC and the mobile station. Upon set up, the MSC forwards the message to the mobile station via the signalling channel (e.g., stand alone dedicated control channel or SDCCH). If the message was delivered successfully, a notification report is sent from the MSC to the originating SMS-C. If not, the HLR is so informed and a failure report is sent from the MSC to the originating SMS-C. The notification report or failure report can be sent to the message originator by the SMS-C.

In order for a user to receive and send text in a short message, certain short message control data is provided to the SMS-C. This control data allows the message originator to specify the destination subscriber to the SMS-C, along with, for example, when (e.g., at 4:00 p.m.) and how (e.g., by facsimile) the text is to be sent to the destination. In the GSM, the SMS has been implemented by the inclusion of an exclusive SMS protocol in parallel with a Q.931 message-oriented call control protocol.

The Q.931 call control interface (also referred to as CCITT Recommendation I.451) is a protocol that specifies what goes into a signaling packet and also defines the message type and content. Specifically, the Q.931 call control interface provides for call setup and take down, the called party number, calling party number information, bearer capability (e.g., voice or data), status checks (for recovery from abnormal events, such as protocol failures or "busy" trunks), release of bearer channels, and error announcements. The Q.931 call control interface is derived from the CCITT Digital Subscriber Signaling System No. 1 (DSS1) user-network ISDN interface.

In other digital mobile radiotelephone systems, such as, for example, the Personal Digital Cellular (PDC) System (also known as the Japanese Digital Cellular Radio System or JDC), and in fixed ISDNs, the Q.931 call control interface has been specified for use, but no parallel SMS interface has been provided. Consequently, although short message text information can be transported in these networks via the existing Q.931 interface, a problem arises in attempting to transport short message control data without a special SMS interface."

Where SMS-C is the SMSC referred to within the specification.

Example 1

FIG. 1 of Example 1 shows an example of an advertisement 10 inviting a participant to call a telephone number and to key in an appropriate alphanumeric response 12, and in this case, the word "PISA".

Figure 2:
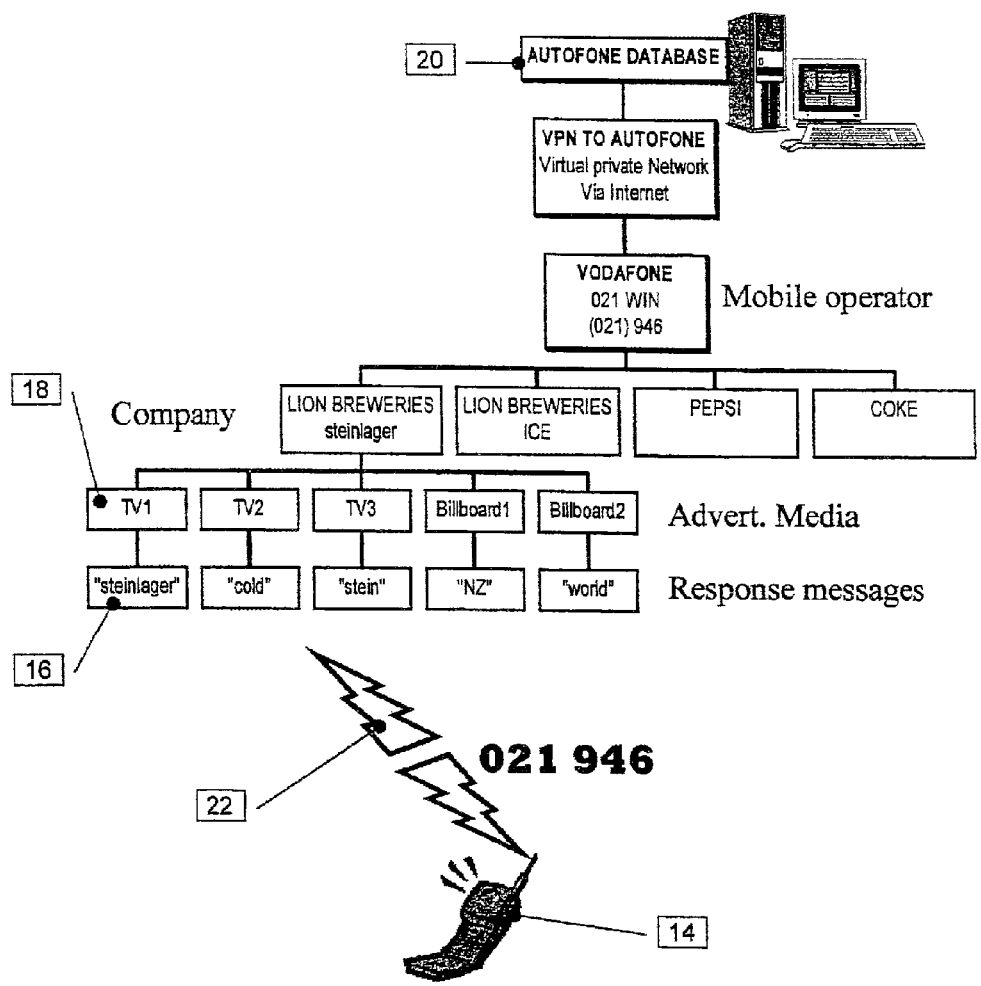
FIG. 2: shows a flow diagram of the components of the invention according to Example 1.

FIG. 2 shows a flow diagram or schema outlining the various components of the invention according to Example 1. In response to an advertisement such as that as shown in FIG. 1, a participant sends a message on a mobile or cell phone 14 and enters the appropriate alphanumeric response or short texted message 16. The response is specific to a particular promotion and the location or where the advertisement was broadcasted from 18 or displayed can be recorded by the computer database 20 which compares and matches the participant's response to a reference list retained in the computer database. If there is a correct match, such as the word "PISA" in the abovementioned example, a short message system (GSM-SMS) text reply 22 is sent to the participant's mobile or cell phone instructing the successful participant to access a specific website on the Internet. The participant can then obtain further details on how to progress in the competition or advertising promotion or survey from the referred website. It is envisaged that with the rapid development in information technology and particularly that concerning mobile and cell phones with Internet access, the participants can then access the website directly from their mobile or cell phones without the need of a personal or laptop computer.

Figure 3:
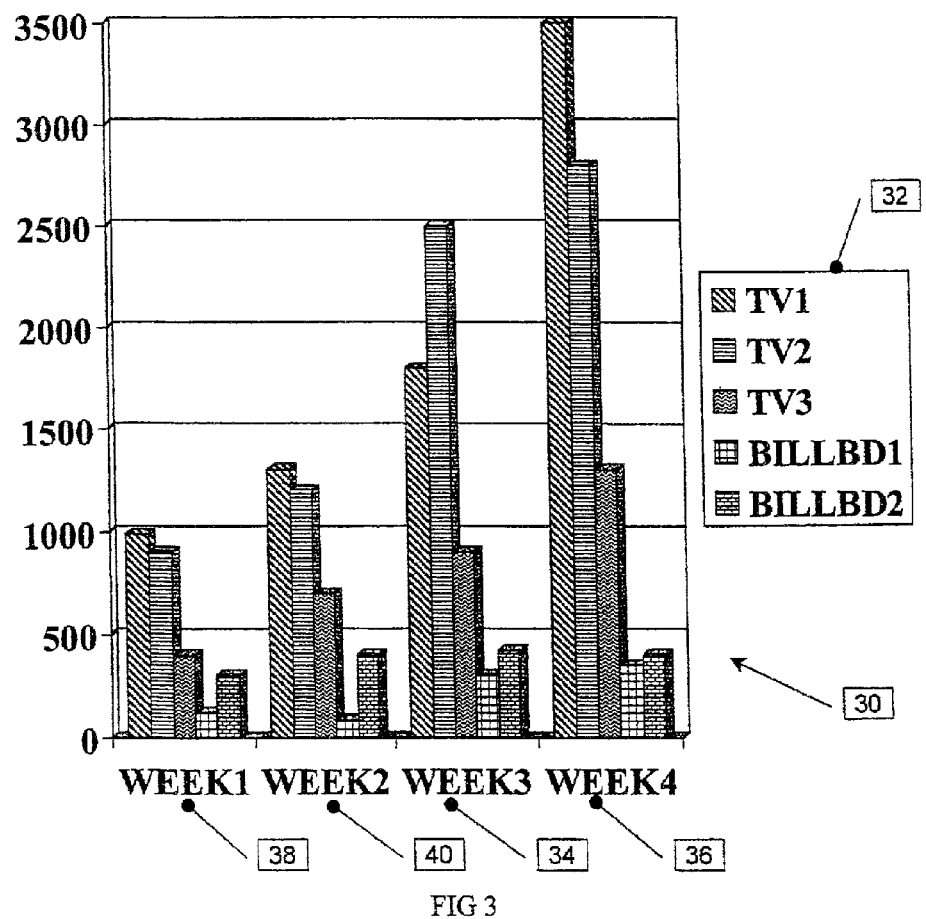
FIGS. 3 and 4: show examples of statistical analyses in the form of bar charts and frequency distribution graphs of the invention in operation.

Referring now to FIG. 3 there shown a bar chart 30 of the number of calls made to a particular advertisement advertised by three television stations and on two bill boards 32. By analysing the bar chart, the effectiveness of the mode of advertising can be gauged from the y-axis, which shows the frequency of calls made to the advertisement. Along the x-axis is shown the duration of the survey, which in this case was over a period of four weeks with the results of each week shown. It will be obvious to the skilled addressee that the frequency of calls made in the later weeks 34, 36 should be greater than those made in the earlier weeks 38, 40 because more consumers would be exposed to the advertisement over time.

Figure 4:
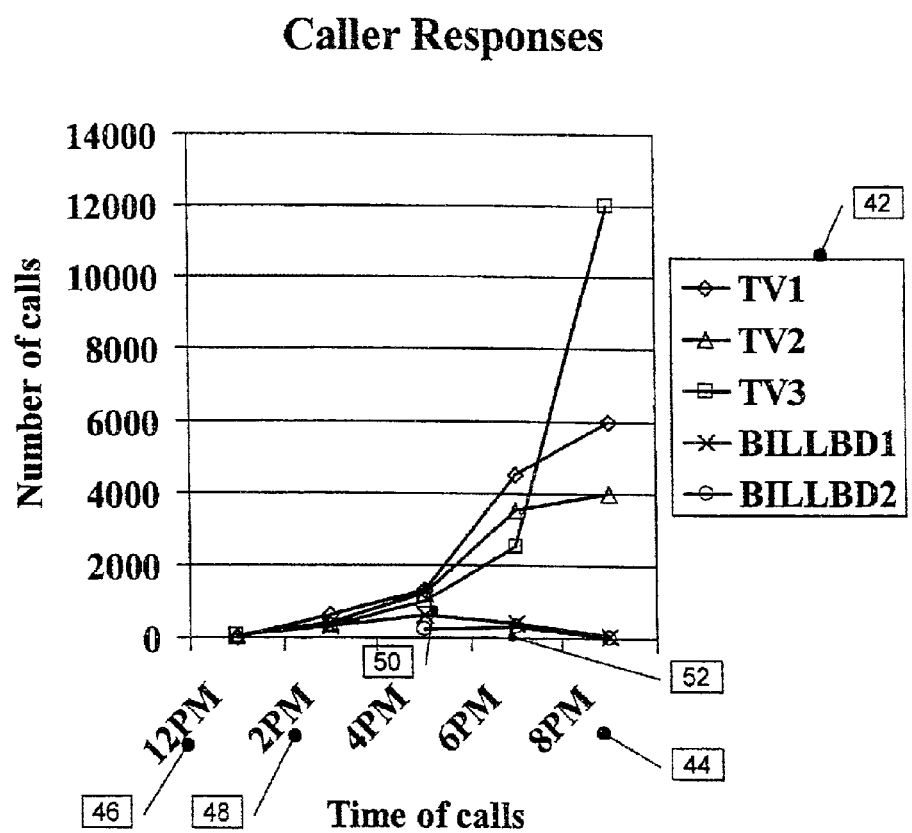

FIG. 4 shows the number of calls made on the y-axis compared to the time of day along the x-axis at which the call is made for an advertisement which was displayed on the three television stations and two bill boards 42 as mentioned previously for FIG. 3.

As far as the advertisement being broadcast by the three television stations from FIG. 4 it can be concluded that the 8 pm slot 44 obtained the most responses as compared to when the advertisement was shown at 12 pm 46 or 2 pm 48 in the afternoon wherein there would have been limited viewing. In contrast responses to the advertisement being displayed on billboards peaked at 5 pm 50 and 7 pm 52 respectively which indicates that effectively this type of advertisement has the greatest exposure when consumers are leaving their work places and possibly as they are driving home.

Figure 5:
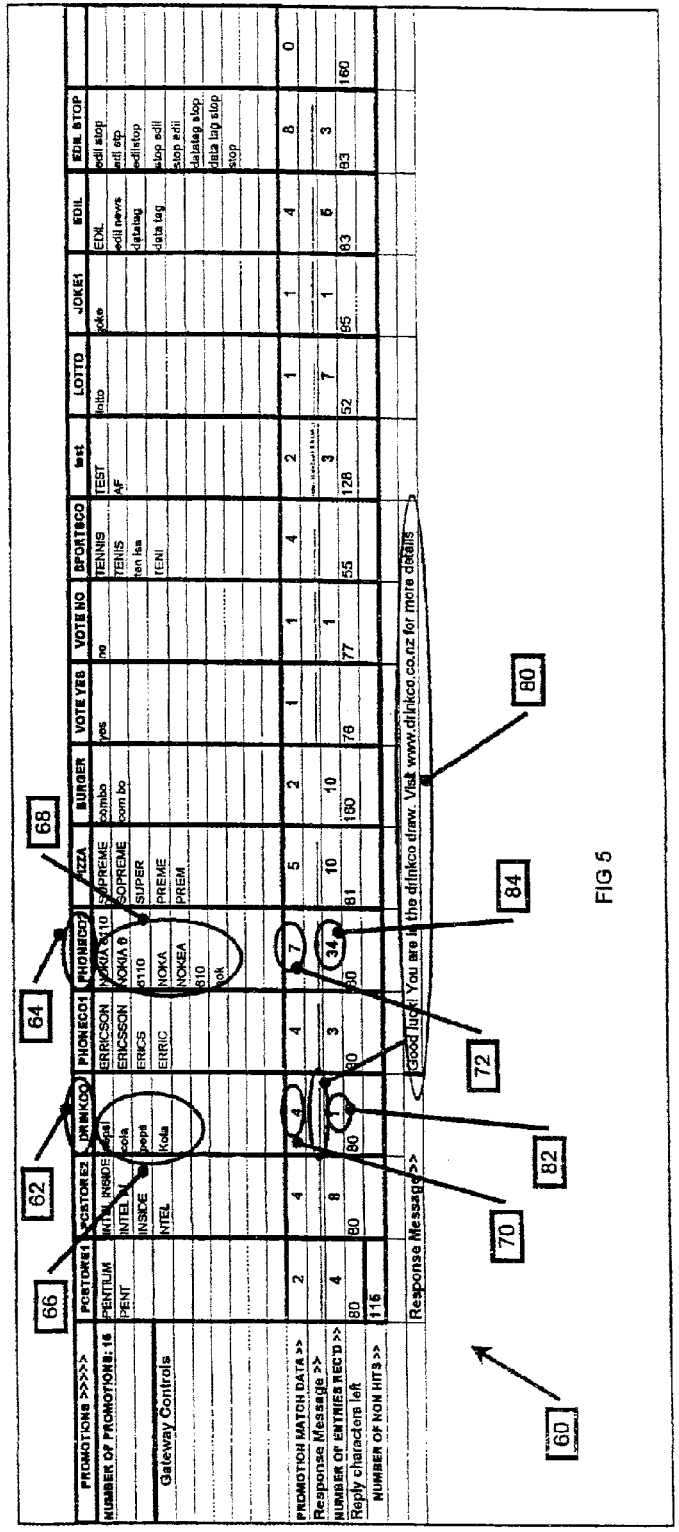
FIG. 5: shows a worksheet of the invention in operation.

Referring now to FIG. 5 which shows a work sheet 60 wherein the various competitions or advertising clients are shown at the top of the columns 62, 64. The appropriate short text message responses 66, 68 are shown under each column together with the number of matches 70, 72 of the correct response as well as the number of entries recorded 82, 84. If a correct match is made between the recorded reference list and the participant's response, a text message 80 inviting the participant to access a website is displayed on the participant's mobile or cell phone (not shown). The number of entries received 82, 84 is recorded which enables a breakdown of the frequency or popularity of the particular competition or survey to be analysed.

Figure 6:
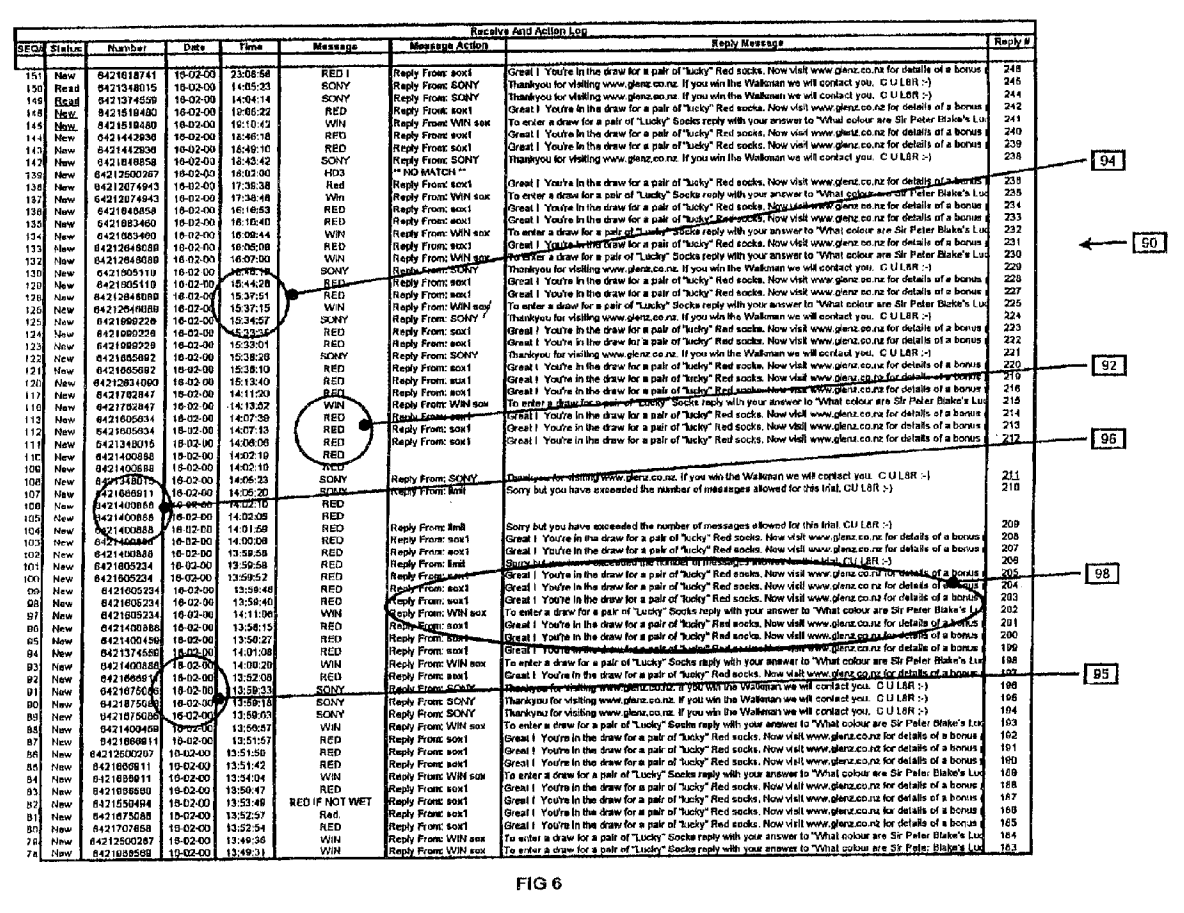

FIG. 6 shows a log of calls received 90 requiring a particular response 92 and the times 94 and dates 95 at which the calls were made and the phone numbers 96 which were received and replied to. The particular response and identification of the client are shown 98. By analysing such a log the popularity or frequency of calls made in response to a particular advertisement or survey question can also be analysed.

Example 2

Product Promotion Example

Figure 7:
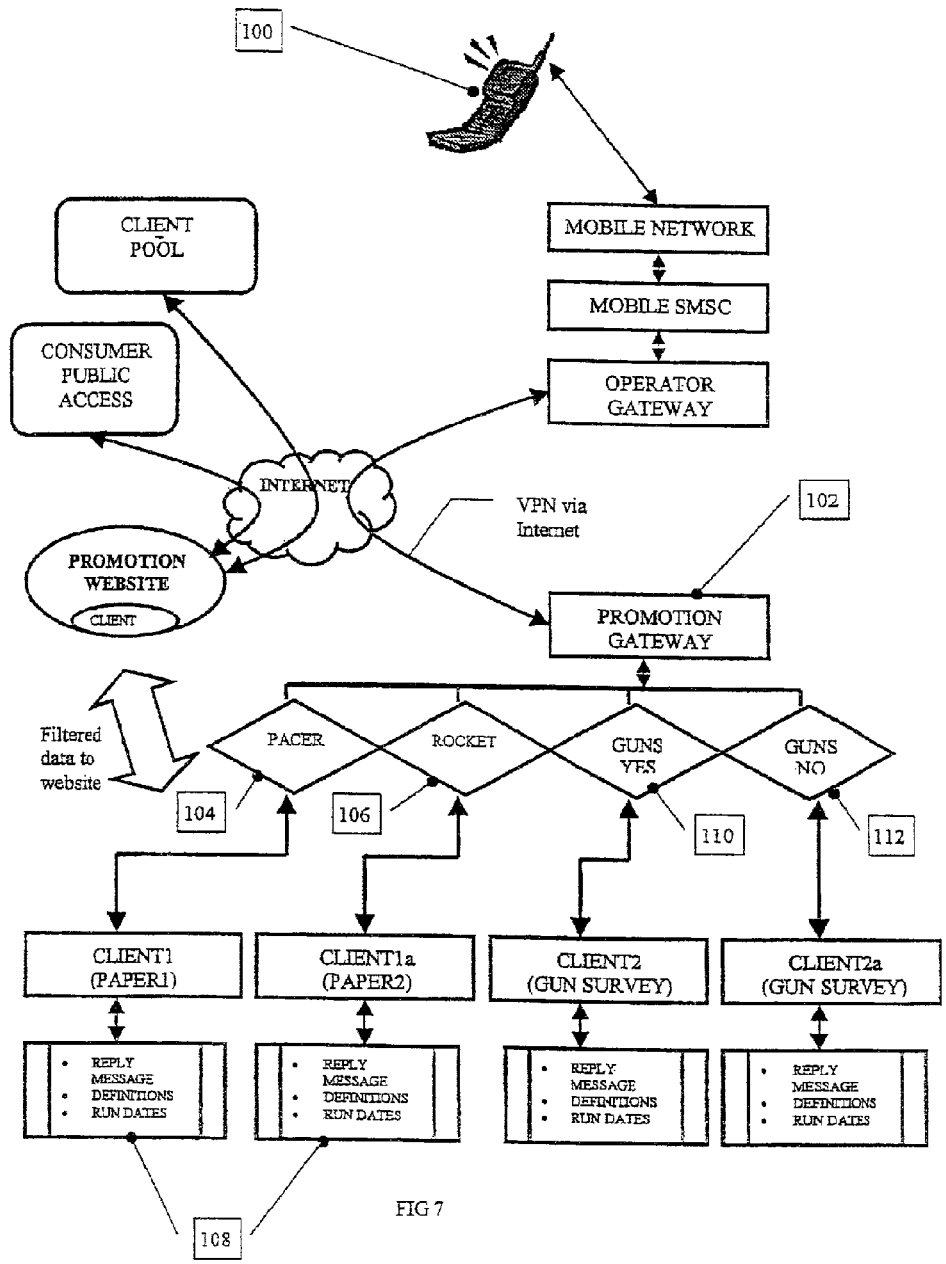
FIG. 7: shows a scheme of an operational layout of the invention according to Example 2 and Example 3 of the invention.

Referring to FIG. 7 there is shown an advertisement by the client ("1") and ("1a"), for example, printed in 2 morning papers (not shown) promoting a new model of running shoe called "Pacer Rockets".

Reader 1 reads the advertisement in paper 1 (not shown) and is invited to enter a draw to win a free pair of the shoes by sending an SMS containing the word "PACER" to number 345678.

Reader 2 reads the advertisement in paper 2 (not shown) and is invited to enter a draw to win a free pair of the shoes by sending an SMS containing the word "ROCKET" to number 345678.

1. Reader 1 and Reader 2 reach for their mobile phones 100 and type in the word "PACER" and "ROCKET" depending on which paper they are reading. In both cases they send this message to 345678.
2. The messages are received at the Promotion gateway 102 of the computer database. The messages contain the mobile number, date sent, time sent, and the message text.
3. The message containing the word "PACER" is processed by a client's application called, "paper 1", 104 searching for the word "PACER". Likewise, the message containing the word "ROCKET" is processed by a client's application called, "paper 2" 106 searching for the word "ROCKET".
4. In this case the same client owns both applications. Both applications in this example simply respond with the same message 108 advising that the entry into the prize draw has been accepted and an invitation is made to visit a website, e.g. "Thank you for entering our PACER ROCKETS prize draw. We will contact you on this number if you are the winner. Visit www.pacerrockets.com for more details."

The transaction is now complete.

Numerous client applications can exist so long as the incoming message from the consumer is always unique.

By running the same advertisement in two newspapers but by varying the word content of the message required to enter the draw the client can obtain answers to the following questions.

How effective was the advertisement in paper 1 compared to paper 2?
What time did the consumers read the advertisement?
What date did the consumers read the advertisement?
Did this advertisement result in a Website visit? The Website can determine this by direct association with the advertisement.

Example 3

Vote or Opinion Poll Example

Referring also to FIG. 7, a television station runs a controversial news story and is seeking public opinion of a new law that would allow guns in schools.

Viewers are invited to join a real time survey where they can send an SMS indicating that they either approve of the new law by sending a message "guns yes" 110. Or if they disapprove they can send the message "guns no" 112. The following steps then ensue:

1. Concerned viewers reach for their mobile phones 100 and send their vote message to number 12345. All voters use this number regardless of the client television station.
2. The messages are received at the Polling gateway 102 of the computer database and routed to one or two applications 110, 112.
3. In the case of a "YES" vote a message is returned to the voter for example, "Your vote in favour of guns in schools has been accepted. So far 10% of voter's agree with you. Stay tuned for the final results or visit www.tvnewsco.com."

4. In the case of a "NO" vote a message is returned to the voter for example, "Your vote against allowing guns in schools has been accepted. So far 90% of voter's agree with you. Stay tuned for the final results or visit www.tvnewsco.com."

The transaction is now complete.

The TV station has a real time, private connection to a specially allocated page on the polling gateway website. The results of the messages are graphically and statistically displayed here in real time indicating the number of "yes" and "no" votes. The TV station can either show this page directly or generate a customised display based on this information.

Advantages

Cost Advantage of SMS

Existing methods of customer feedback include "900" numbers that attract typically high usage rates to the participant. Rates of a few dollars per minute are not uncommon. This can cause consumer reluctance particularly when younger family members can cause huge phone bills to accumulate. The cost of an SMS typically is half that of posting a letter and in some cases is free. Up to 160 characters of text can be sent using a standard SMS.

Time Advantage of SMS

The use of "physical" mail is decreasing as people move to electronic alternatives such as email. At present, email is still emerging in the mobile phone market so it does not have the convenience factor of SMS. Physical mail requires a larger effort on behalf of the consumer and replies are not immediate.

Interactive Advantage of SMS

When an SMS is sent from a mobile phone the overall delivery time is typically a few seconds. Third party applications that are connected to the SMS gateway should be able to respond in a similar time frame. Intelligent applications can create a 2-way dialog between the consumer and client application in order to request further consumer information or simply to inform the consumer.

Transaction Possibilities

The SMS reply message can inform the consumer that their message has been processed. It may also contain invitations to send a further message to complete the transaction. Invitations to visit Web sites belonging to or linking the promoter client may be made. In the case of an opinion poll or vote system indications may be made of the poll progress such as the number of "YES" or "NO" votes received to date.

Existing Promotion Structures

Existing methods of obtaining customer feedback require a unique destination that is selected by the consumer and that shows the process for them.

With voice based phone applications, this may necessitate the dialing of a unique phone number or dialing a number and selecting a destination by a menu driven process, e.g. Press 1 for "Shoes" or Press 2 for "computers".

With physical mail or email responses an address is required and often a sub address or department has to be indicated, e.g. marketing promotions attn Shoes competition.

SMS Multi Client

By using a common number for SMS delivery, messages can be automatically routed to multiple clients based on the content of the message. This eliminates the need for a unique address/phone number for every client using this system.

By careful selection of the likely or required responses from all the client's customers' messages can be routed to the required client's application for processing and to be responded to.

Every message contains the mobile number of the originating message. This becomes the reply path for the client's application allowing a two-way transaction to occur.

Privacy Advantage of SMS

No subscription is required by the mobile user making it is available for use by any SMS capable phone. The only requirement is that the mobile number is forwarded with the message. One of the biggest fears of potential participants of such SMS transactions is that it may result in un-solicited "junk" messages as occurs with email. It is vital for the success of this system that it remains what the industry refers to as a "pull" service. This means that the participant only gets a message as a result of a message sent by them. The only variation would be notification of a prize that may occur several days or months after the original transaction. To help maintain privacy for consumers the operator of this system must retain ownership of all messages and never divulge mobile numbers to its clients. Only statistical details should be passed to the client's prize-winner contact numbers.

Consumers do not need to pass on their identity further than their mobile number, which is an inherent feature of SMS. This will be a key feature that many consumers will prefer. The only requirement for personal details to be divulged would be in the case of prize delivery etc.

Branding and Association of the SMS Destination Number

To speed up the transaction and likelihood of response it would be ideal that the user already has the number stored in their mobile phone. This would allow consumers to concentrate on the transaction "keyword" rather than trying to remember the phone number. This is particularly useful in the case of Billboard advertising where time is limited. A custom logo (perhaps one for promotions and one for voting) would be used to associate the promotion with an SMS promotion that the consumer had used before. Because they already understand the process they are more likely to respond.

VARIATIONS

Finally it will be appreciated that various other alterations and modifications may be made to the foregoing without departing from the scope of this invention as claimed.

The invention claimed is:

1. An interactive system utilizing short text messages transmitted by Short Message Service (SMS), the interactive system comprising:
(a) a plurality of separate advertisements each advertising by non-SMS means an identical product or service and each inviting a response via SMS to a predetermined number common to all of the advertisements, each advertisement requesting the response to the advertisement by texting to the predetermined number a different predetermined SMS short text message having distinct content that identifies the predetermined SMS short text message as being the response to one of the advertisements and not the other advertisements; and
(b) a computer system for receiving a short text message sent via SMS to the predetermined phone number in response to the plurality of advertisements, the computer system being adapted to identify the received short text message as being in response to a particular one of the advertisements by searching a content of the received short text message and identifying at least a portion of the distinct content associated with at least one of the advertisements in the content of the received short text message, the computer system being operable to send an automated short text message via SMS in response to receiving the received short text message.

2. The interactive system of claim 1, wherein the computer system is adapted to select from a plurality of different preselected reply messages to send as the automated short text message based on the distinct content identified in the received short text message.

3. The interactive system of claim 1, wherein the computer system is adapted to record information obtained from the received short text message in a database, the recorded information including at least a number associated with the response.

4. The interactive system of claim 1, wherein the computer system is adapted to compare the received short text message with one or more reference records and identify the received short text message as being associated with a particular advertising campaign selected from a plurality of advertising campaigns depending upon which of the one or more reference records the received short text message at least partially matches.

5. An interactive system utilizing short text messages, the interactive system comprising:
   (a) a first advertisement and a second advertisement each advertising an identical product or service via non-Short Message Service (SMS) means, wherein each advertisement invites a response via SMS to a single predetermined number, each advertisement including distinct content not present in the other advertisement, each advertisement including instructions requesting the response to the advertisement by sending a predetermined SMS short text message to the single predetermined number; and
   (b) a computer system for receiving a short text message sent from by SMS to the predetermined number, the computer system being adapted to identify the received short text message as being in response to either the first advertisement or the second advertisement and not the other advertisement by searching a content of the received short text message and locating at least a portion of the distinct content associated with the first or second advertisement in the content of the received short text message.

6. The system of claim 5, wherein the distinct content of the first advertisement indicates that the first advertisement was presented in a first predetermined area, and
   wherein the distinct content of the second advertisement indicates that the second advertisement was presented in a second predetermined area different than the first predetermined area in which the first advertisement was presented.

7. The system of claim 5, wherein the distinct content of the first advertisement indicates that the first advertisement was presented during a first predetermined time slot, and
   wherein the distinct content of the second advertisement indicates that the second advertisement was presented during a second predetermined time slot different than the first predetermined time slot in which the first advertisement was presented.

8. The system of claim 5, wherein the distinct content of the first advertisement indicates that the first advertisement was presented by a first advertising entity, and
   wherein the distinct content of the second advertisement indicates that the second advertisement was presented by a second advertising entity separate from the first advertising entity.

9. The system of claim 5, wherein the product or service is a polling service requesting a response to a survey question.

10. The system of claim 5, wherein the first advertisement is of a first type of media and the second advertisement is of a second type of media different than the first type of media.

11. The system of claim 10, wherein the first and second types of media are selected from a group consisting of television, radio, printed material, billboard, film, and internet.

12. The system of claim 5, wherein the computer system is adapted to automatically send a response via SMS to the received short text message containing additional information related to the product or service.

13. The system of claim 12, wherein the response includes instructions to access an internet website related to the product or service.

14. The system of claim 12, wherein the product or service is a polling service and the predetermined short text message includes an answer to a survey question,
   wherein the computer system is adapted to automatically record a number of responses having a first predetermined answer and also record a number of responses made having a second predetermined answer, and
   wherein the automatically sent response includes an indication of whether there are more responses having the first predetermined answer or the second predetermined answer.

15. The system of claim 5, further comprising a third advertisement advertising via non-SMS means a different product or service than advertised by the first and second advertisements,
   wherein the third advertisement invites a response via a SMS to the single predetermined number,
   wherein the third advertisement includes distinct content not present in the first or second advertisements, and
   wherein the computer system is adapted to identify the received short text message as being in response to either the first, second, or third advertisement and not the other advertisements by searching the content of the received short text message and locating at least a portion of the distinct content associated with the first, second, or third advertisement in the content of the received short text message.

16. The system of claim 15, wherein the first and second advertisements are sponsored by a first entity and the third advertisement is sponsored by a second entity separate from the first entity,
   wherein the computer system is adapted to automatically route the received short text message received via SMS to either the first entity or the second entity based on whether the portion of the distinct content identified by the computer system in the content of the received short text message is associated with the first, second, or third advertisement.

17. The system of claim 5, wherein the distinct content is a single word or a single string of characters.

18. The system of claim 5, wherein the first advertisement and second advertisement each invite entry to a draw to win a prize by responding to the first or second advertisement by texting via SMS the predetermined short text message to the predetermined number.

19. A method of operating an interactive system utilizing Short Message Service (SMS) text messages, the method comprising:
   presenting, by at least one of visual and non-visual means, at least a first advertisement and a second advertisement, each advertising an identical product or service by non-SMS means, the first and second advertisements each including a unique code not present in the other advertisement, each advertisement inviting a response to the advertisement by sending a predetermined SMS short text message via SMS to a single predetermined number;

providing a database stored on a computer, the database containing the first code and the second code, the database correlating the first and second codes to the first and second advertisements, respectively;

receiving via SMS a short text message sent in response to the first or second advertisement;

searching, by computer, a content of the received short text message and identifying at least a portion of the unique code associated with the first or second advertisement; and classifying, by computer, the received short text message as being in response to either the first or the second advertisement and not the other advertisement depending on whether the portion of the unique code identified is associated with the first or second advertisement.

20. The method of claim 19, further comprising:
presenting the first advertisement at a first time slot and presenting the second advertisement at a second time slot later than the first time slot; and
determining a quantity of responses received at the predetermined number in response to the first advertisement and determining a quantity of responses received at the predetermined number in response to the second advertisement.

21. The method of claim 20, further comprising presenting the first and second advertisements at different times in a single day.

22. The method of claim 19, further comprising:
presenting the first advertisement at a first location and presenting the second advertisement at a second location located remotely of the first location; and
determining a quantity of responses received at the predetermined number in response to the first advertisement and determining a quantity of responses received at the predetermined number in response to the second advertisement.

23. The method of claim 19, further comprising:
presenting, by a first entity, the first advertisement by non-SMS means;
presenting, by a second entity, the second advertisement by non-SMS means;
determining a quantity of responses received via SMS at the predetermined number in response to the first advertisement; and
determining a quantity of responses received via SMS at the predetermined number in response to the second advertisement.

24. The method of claim 19, wherein the product or service is a polling service requesting a survey response.

25. The method of claim 19, further comprising presenting the first advertisement by a first type of media and presenting the second advertisement by a second type of media different than the first type of media.

26. The method of claim 25, wherein the first and second types of media are selected from a group consisting of television, radio, print media, billboard, film, and internet.

27. The method of claim 19, further comprising automatically sending a response to the received short text message via SMS containing additional information related to the product or service.

28. The method of claim 27, wherein the response includes instructions to access an internet website related to the product or service.

29. The method of claim 19, wherein the unique code associated with the first advertisement is used to identify that the first advertisement was presented in a different geographic location than the second advertisement.

30. The method of claim 19, further comprising indicating that the first advertisement was presented at a different time than the second advertisement using the unique code associated with the first advertisement.

31. The method of claim 19, further comprising:
presenting the first advertisement on a first piece of print media;
presenting the second advertisement on a second piece of print media separate from the first piece of print media; and
indicating that the first advertisement was presented on the first piece of print media and not on the second piece of print media using the unique code associated with the first advertisement.

32. The method of claim 19, further comprising indicating that the first advertisement was presented by a predetermined type of media, at a predetermined time, at a predetermined location, or by a predetermined entity using the unique code associated with the first advertisement.

33. The method of claim 19, further comprising:
using the first and second advertisements to invite entry to a draw to win a prize by responding to the first or second advertisement by texting the predetermined short text message to the predetermined number.

34. An interactive system utilizing short text messages received via Short Message Service (SMS), the interactive system comprising:
(a) at least a first advertisement and a second advertisement each concurrently advertising via SMS means an identical product or service, each advertisement inviting a response via SMS to a single predetermined number, each advertisement including instructions requesting the response with a different predetermined SMS short text message having distinct content that distinctly identifies the predetermined SMS short text message as being the response to either the first advertisement or the second advertisement and not the other advertisement; and
(b) a computer system configured to receive short text messages via SMS to the single predetermined, the computer system adapted to identify the received short text message as being in response to either the first advertisement or the second advertisement and not the other advertisement by searching a content of each received short text message and identifying at least a portion of the distinct content associated with the first or second advertisement in the content of the received short text message.

35. A method of operating an interactive system which utilizes Short Message Service (SMS), the method comprising:
presenting, by at least one of visual and non-visual means, multiple advertisements each advertising an identical product or service by non-SMS means, each advertisement inviting a response via a SMS text message containing a respective one of multiple predetermined codes via a communication device to the same predetermined number, at least one of the predetermined codes being different from others of the predetermined codes associated with the other of the multiple advertisements;

providing a database stored on a computer, the database containing the multiple predetermined codes, the database correlating the multiple predetermined codes to respective ones of the multiple advertisements;

receiving, at a SMS gateway, via SMS, the short text messages sent to the predetermined number in response to the multiple advertisements;

searching, by computer, a content of each of the received text messages for the multiple predetermined codes; and classifying, by computer, each of the received text messages as being in response to a respective one of the multiple advertisements based on the correlation between the predetermined code contained in said text message and the respective one of the multiple advertisements.

36. An interactive system utilizing short text messages transmitted by Short Message Service (SMS), the interactive system comprising:

(a) a plurality of separate advertisements each advertising by non-SMS means an identical product or service and each inviting a response via SMS to a predetermined number common to all of the advertisements, each advertisement requesting the response to the advertisement by texting to the predetermined number a different predetermined short text message having distinct content that identifies the predetermined SMS short text message as being a response to one of the advertisements and not the other advertisements; and (b) a computer system for receiving a short text message sent via SMS to the predetermined number in response to the plurality of advertisements, the computer system adapted to identify the received short text message as being in response to a particular one of the advertisements by searching a content of the received short text message and identifying at least a portion of the distinct content associated with at least one of the advertisements in the content of the received short text message, the computer system being configured to send an automated short text message via SMS in response to receiving the received short text message.

37. The interactive system of claim 36, wherein the automated short text message directs a recipient to access a preselected website.

38. The interactive system of claim 36, wherein the computer system is adapted to select from a plurality of different preselected messages to send as the automated short text message based on the distinct content identified in the received short text message.

39. The interactive system of claim 36, wherein the computer system is adapted to record information obtained from the received short text message in a database, the recorded information including at least a number associated with the response.

40. The interactive system of claim 36, wherein the computer system is adapted to compare the received short text message with one or more reference records and identify the received short text message as being associated with a particular advertising campaign selected from a plurality of advertising campaigns depending upon which of the one or more reference records the received short text message at least partially matches.

41. An interactive system utilizing Short Message Service (SMS) short text messages, the interactive system comprising:

(a) a first advertisement and a second advertisement each advertising an identical product or service via non-SMS based media, each advertisement inviting a response via SMS to a single predetermined number, each advertisement including distinct content not present in the other advertisement, each advertisement including instructions requesting the response to the advertisement by sending a predetermined SMS short text message to the single predetermined number; and (b) a computer system for receiving a short text message sent by SMS to the predetermined phone number, the computer system adapted to identify the received short text message as being in response to either the first advertisement or the second advertisement and not the other advertisement by searching a content of the received short text message and locating at least a portion of the distinct content associated with the first or second advertisement in the content of the received short text message.

42. The system of claim 41, wherein the distinct content of the first advertisement indicates that the first advertisement was presented in a first predetermined area, and wherein the distinct content of the second advertisement indicates that the second advertisement was presented in a second predetermined area different than the first predetermined area in which the first advertisement was presented.

43. The system of claim 41, wherein the distinct content of the first advertisement indicates that the first advertisement was presented during a first predetermined time slot, and wherein the distinct content of the second advertisement indicates that the second advertisement was presented during a second predetermined time slot different than the first predetermined time slot in which the first advertisement was presented.

44. The system of claim 41, wherein the distinct content of the first advertisement indicates that the first advertisement was presented by a first advertising entity, and wherein the distinct content of the second advertisement indicates that the second advertisement was presented by a second advertising entity separate from the first advertising entity.

45. The system of claim 41, wherein the product or service is a polling service requesting a response to a survey question.

46. The system of claim 41, wherein the first advertisement is of a first type of media and the second advertisement is of a second type of media different than the first type of media.

47. The system of claim 46, wherein the first and second types of media are selected from a group consisting of television, radio, printed material, billboard, film, and internet.

48. The system of claim 41, wherein the computer system is configured to automatically send a response via SMS to the received short text message containing additional information related to the product or service.

49. The system of claim 48, wherein the automatically sent response includes instructions to access an internet website related to the product or service.

50. The system of claim 48, wherein the product or service is a polling service and the predetermined short text message includes an answer to a survey question, wherein the computer system is adapted to automatically record a number of responses having a first predetermined answer and also record a number of responses made having a second predetermined answer, and wherein the automatically sent response includes an indication of whether there are more responses having the first predetermined answer or the second predetermined answer.

51. The system of claim 41, further comprising a third advertisement advertising via non-SMS based media a different product or service than advertised by the first and second advertisements,
wherein the third advertisement invites one or more participants to respond via SMS to the single predetermined number,
wherein the third advertisement includes distinct content not present in the first or second advertisements, and
wherein the computer system is adapted to identify the received short text message as being in response to either the first, second, or third advertisement and not the other advertisements by searching the content of the received short text message and locating at least a portion of the distinct content associated with the first, second, or third advertisement in the content of the received short text message.

52. The system of claim 41, wherein the first and second advertisements are sponsored by a first entity and the third advertisement is sponsored by a second entity separate from the first entity,
wherein the computer system is adapted to automatically route the received short text message received via SMS to either the first entity or the second entity based on whether the portion of the distinct content identified by the computer system in the content of the received short text message is associated with the first, second, or third advertisement.

53. The system of claim 41, wherein the distinct content is a single word or a single string of characters.

54. The system of claim 41, wherein the first advertisement and second advertisement each invite entry to a draw to win a prize by responding to the first or second advertisement by texting via SMS the predetermined short text message to the predetermined number.

55. A method of operating an interactive system utilizing Short Message Service (SMS) text messages, the method comprising:
presenting, by at least one of visual and non-visual means, at least a first advertisement and a second advertisement, each advertising an identical product or service by non-SMS means, the first and second advertisements each including a unique code not present in the other advertisement, each advertisement inviting a response to the advertisement by sending a predetermined SMS short text message via SMS to a single predetermined number;
providing a database stored on a computer, the database containing the first code and the second code, the database correlating the first and second codes to the first and second advertisements, respectively;
receiving, via a SMS gateway, a short text message sent to the predetermined number in response to the first or second advertisement;
searching, by computer, a content of the received short text message and identifying at least a portion of the unique code associated with the first or second advertisement in the content of the received short text message; and
classifying, by computer, the received short text message as being in response to either the first or the second advertisement and not the other advertisement depending on whether the portion of the unique code identified is associated with the first or second advertisement.

56. The method of claim 55, further comprising:
presenting the first advertisement at a first time slot and presenting the second advertisement at a second time slot later than the first time slot; and
determining a quantity of responses received at the predetermined number in response to the first advertisement and determining a quantity of responses received at the predetermined number in response to the second advertisement.

57. The method of claim 56, further comprising presenting the first and second advertisements at different times in a single day.

58. The method of claim 55, further comprising:
presenting the first advertisement at a first location and presenting the second advertisement at a second location located remotely of the first location; and
determining a quantity of responses received at the predetermined number in response to the first advertisement and determining a quantity of responses received at the predetermined number in response to the second advertisement.

59. The method of claim 55, further comprising:
presenting, by a first entity, the first advertisement by non-SMS means;
presenting, by a second entity, the second advertisement by non-SMS means;
determining a quantity of responses received via SMS at the predetermined number in response to the first advertisement; and
determining a quantity of responses received via SMS at the predetermined number in response to the second advertisement.

60. The method of claim 55, wherein the product or service is a polling service requesting a survey response.

61. The method of claim 55, further comprising presenting the first advertisement by a first type of media and presenting the second advertisement by a second type of media different than the first type of media.

62. The method of claim 61, wherein the first and second types of media are selected from a group consisting of television, radio, print media, billboard, film, and internet.

63. The method of claim 55, further comprising automatically sending a response to the received short text message via SMS containing additional information related to the product or service.

64. The method of claim 63, wherein the response includes instructions to access an internet website related to the product or service.

65. The method of claim 55, wherein the unique code associated with the first advertisement is used to identify that the first advertisement was presented in a different geographic location than the second advertisement.

66. The method of claim 55, further comprising indicating that the first advertisement was presented at a different time than the second advertisement using the unique code associated with the first advertisement.

67. The method of claim 55, further comprising:
presenting the first advertisement on a first piece of print media;
presenting the second advertisement on a second piece of print media separate from the first piece of print media; and
indicating that the first advertisement was presented on the first piece of print media and not on the second piece of print media using the unique code associated with the first advertisement.

68. The method of claim 55, further comprising indicating that the first advertisement was presented by a predetermined type of media, at a predetermined time, at a predetermined location, or by a predetermined entity using the unique code associated with the first advertisement.

69. The method of claim 55, further comprising using the first and second advertisements to invite entry to a draw to win a prize by responding to the first or second advertisement by texting the predetermined short text message to the predetermined number.

70. An interactive system utilizing short text messages transmitted via Short Message Service (SMS), the interactive system comprising:
(a) at least a first advertisement and a second advertisement each concurrently advertising via non-SMS means an identical product or service, each advertisement inviting a response via SMS to a single predetermined number, each advertisement including instructions requesting the response with a different predetermined SMS short text message having distinct content that distinctly identifies the predetermined SMS short text message as being a response to either the first advertisement or the second advertisement and not the other advertisement; and
(b) a computer system for receiving a short text message sent via SMS to the single predetermined number in response to the first and second advertisements, the computer system adapted to identify the received short text message as being in response to either the first advertisement or the second advertisement and not the other advertisement by searching a content of the received short text message and identifying at least a portion of the distinct content associated with the first or second advertisement in the content of the received short text message.

71. A method of operating an interactive system which utilizes Short Message Service (SMS), the method comprising:
presenting, by at least one of visual and non-visual means, multiple advertisements each advertising an identical product or service by non-SMS means, each advertisement inviting a response via a SMS text message containing a respective one of multiple predetermined codes via SMS to the same predetermined number, at least one of the predetermined codes being different from others of the predetermined codes associated with others of the multiple advertisements;
providing a database stored on a computer, the database containing the multiple predetermined codes, the database correlating the multiple predetermined codes to respective ones of the multiple advertisements;
receiving, via SMS gateway, the short text messages sent to the predetermined number in response to the multiple advertisements;
searching, by computer, a content of each of the received text messages for the multiple predetermined codes; and
classifying, by computer, each of the received text messages as being in response to a respective one of the multiple advertisements based on the correlation between the predetermined code contained in said text message and the respective one of the multiple advertisements.

72. A method of operating an interactive system utilizing Short Message Service (SMS) text messages, the method comprising:
presenting, by at least one of visual and non-visual means, a plurality of different advertisements, each of the advertisements inviting participants to send a SMS short text message to single predetermined SMS-capable number, each of the different advertisements identifying as the SMS short text message a respective one of multiple codes, each of the multiple codes being distinguishable from others of the multiple codes by a computer;
storing information in a computer database that defines a correlation between the multiple codes and the different advertisements, respectively;
(c) receiving, via a SMS gateway, the short text messages sent to the predetermined SMS-capable number, in response to one of the different advertisements;
searching, by computer, content of each of the received short text messages and identifying the computer-distinguishable code contained in said received short text message; and
classifying, by computer, the received short text messages to produce a set of classified results in terms of the different advertisements based on the correlation between the respective computer-distinguishable codes and the different advertisements.

73. The method of claim 72, wherein the classified results are displayed in real time.

74. The method of claim 72, wherein the classified results are displayed on a web site.

75. An interactive system utilizing short text messages transmitted by Short Message Service (SMS), the interactive system comprising:
a computer system configured to receive one or more short text messages sent via SMS to a predetermined number, each of the short text messages comprising distinct content sufficient to identify a distinct one of a plurality of advertisements advertising an identical product or service by non-SMS means, the computer system being configured to identify at least a portion of the distinct content associated with at least one of the advertisements to identify the distinct one of the plurality of advertisements, the computer system being configured to send an automated short text message via SMS in response to receiving the one or more received short text messages.

* * * * *